(12) United States Patent
Bellingan

(10) Patent No.: US 9,413,854 B1
(45) Date of Patent: Aug. 9, 2016

(54) NETWORK-ACCESSIBLE SIGNAL PROCESSING SERVICE

(71) Applicant: Amazon Technologies, Inc., Reno, NV (US)

(72) Inventor: Carl Bellingan, Riebeek West (ZA)

(73) Assignee: Amazon Technologies, Inc., Reno, NV (US)

( * ) Notice: Subject to any disclaimer, the term of this patent is extended or adjusted under 35 U.S.C. 154(b) by 140 days.

(21) Appl. No.: 13/942,618

(22) Filed: Jul. 15, 2013

(51) Int. Cl.
*G06F 15/16* (2006.01)
*H04L 29/06* (2006.01)

(52) U.S. Cl.
CPC ...................................... *H04L 67/42* (2013.01)

(58) Field of Classification Search
CPC ....................................................... H04L 67/42
See application file for complete search history.

(56) References Cited

U.S. PATENT DOCUMENTS

| | | | |
|---|---|---|---|
| 6,470,380 B1 * | 10/2002 | Yoshizawa et al. | 709/213 |
| 6,535,058 B1 * | 3/2003 | Kirn | 330/10 |
| 6,538,504 B1 * | 3/2003 | Kirn | 330/10 |
| 6,538,505 B1 * | 3/2003 | Kirn | 330/10 |
| 6,563,378 B1 * | 5/2003 | Kirn | 330/10 |
| 6,643,147 B2 * | 11/2003 | Kirn | 363/19 |
| 6,744,311 B2 * | 6/2004 | Kirn | 330/10 |
| 6,768,375 B2 * | 7/2004 | Kirn | 330/10 |
| 6,771,120 B2 * | 8/2004 | Kirn | 330/10 |
| 7,142,049 B2 * | 11/2006 | Kirn | 330/10 |
| 7,386,586 B1 | 6/2008 | Headley et al. | |
| 7,752,189 B2 * | 7/2010 | Yamashita | 707/706 |
| 8,254,404 B2 * | 8/2012 | Rabenko et al. | 370/429 |
| 8,359,596 B2 | 1/2013 | Kobayashi et al. | |
| 8,463,633 B2 | 6/2013 | Jung et al. | |
| 8,473,967 B2 * | 6/2013 | Weiser et al. | 719/317 |
| 8,555,251 B2 * | 10/2013 | Yamashita | 717/121 |
| 8,754,842 B2 * | 6/2014 | Ludwig | 345/104 |
| 8,892,620 B2 * | 11/2014 | Jennings et al. | 708/517 |
| 2003/0005073 A1 * | 1/2003 | Yoshizawa et al. | 709/213 |
| 2005/0278451 A1 * | 12/2005 | Yamashita | 709/229 |
| 2006/0218525 A1 * | 9/2006 | Yamashita | 717/109 |
| 2007/0250835 A1 | 10/2007 | Kobayashi et al. | |
| 2009/0125362 A1 | 5/2009 | Reid et al. | |
| 2011/0271289 A1 * | 11/2011 | Weiser et al. | 719/317 |

(Continued)

OTHER PUBLICATIONS

Alejandro Abdelnur, "Oozie Specification, a Hadoop Workflow System," Oct. 8, 2010, retrieved from http://rvs.github.com/oozie/releases/2.2.1/WorkftowFunctionaiSpec.html on Feb. 11, 2013. pp. 1-37.

(Continued)

*Primary Examiner* — Ario Etienne
*Assistant Examiner* — Andrea Hurst
(74) *Attorney, Agent, or Firm* — Robert C. Kowert; Myertons, Hood, Kivlin, Kowert & Goetzel, P.C.

(57) ABSTRACT

Methods and apparatus for a network-accessible signal-processing service are disclosed. A programmatic interface may be established to enable clients to specify a signal processing workflow comprising one or more elements with respective data sources, data destinations, and processing techniques to be applied to the data obtained from the data sources. An indication of a particular workflow may be received via the interface. A processing technique indicated for an element of the workflow may be initiated at a resource of a provider network, on a data set obtained from a data source of the element. A result of the analysis may be transmitted to a data destination of the element.

20 Claims, 11 Drawing Sheets

(56) References Cited

U.S. PATENT DOCUMENTS

| | | |
|---|---|---|
| 2012/0185913 A1* | 7/2012 | Martinez et al. ............ 726/1 |
| 2012/0204169 A1* | 8/2012 | Breiter et al. ............ 717/171 |
| 2014/0075032 A1* | 3/2014 | Vasudevan et al. ......... 709/226 |
| 2014/0098279 A1* | 4/2014 | Ludwig .................... 348/335 |
| 2014/0104475 A1* | 4/2014 | Ludwig .................... 348/332 |

OTHER PUBLICATIONS

Ani I Pillai and Alejandro Abdelnur, "Oozie Coordinator Specification," Oct. 8, 2010., retrieved from http://rvs.github.com/oozie/releases/2.2.1/CoordinatorFunctionaiSpec.html on Feb. 11, 2013. pp. 1-43.

"Oozie- Design," retrieved from http://rvs.github.com/oozie/design.html on Feb. 11, 2013. pp. 1-2.

"Quartz Scheduler 2.1.x Documentation," retrieved from http://quartz-scheduler.org/files/documentation/Quartz-2.1.x-Documentation.pdf on Feb. 11, 2013. pp. 1-140.

U.S. Appl. No. 13/764,716, filed Feb. 11, 2013, Kathryn Marie Shih et al.

U.S. Appl. No. 13/764,711, filed Feb. 11, 2013, Kathryn Marie Shih et al.

U.S. Appl. No. 61/738,967, filed Dec. 18, 2012, Kathryn Marie Shih et al.

U.S. Appl. No. 13/465,944, filed May 7, 2012, Jonathan B. Corley et al.

U.S. Appl. No. 13/465,978, filed May 7, 2012, Jonathan B. Corley et al.

U.S. Appl. No. 13/476,987, filed May 21, 2012, Jacob Gabrielson et al.

* cited by examiner

Mobile Feedback of Correlated Audio Events

Binary Amplitude Shift Key (ASK) Demodulation

NETWORK-ACCESSIBLE SIGNAL PROCESSING SERVICE

BACKGROUND

Signal processing techniques of various kinds (such as demodulating carrier waveforms, computing Fourier transforms, and the like, have been in use in telecommunications and other industries for decades. For some kinds of signal processing applications, analog signals (e.g., signals collected by sensors or antennas) are converted into digital data, and then sophisticated analysis algorithms are run on the digitized data to extract information. The process may be reversed for other kinds of applications in which various types of algorithms are used to convert digital data to analog form for output, e.g., in the form of audio or video signals. The output from one analysis algorithm may in some cases be used as input for another algorithm, resulting in a pipelined signal processing architecture.

As the costs of using mobile phones and other devices that include sensors have fallen in recent years, the number of potential sources and destinations of data for which signal processing applications may be implemented has increased dramatically. More and more sensor-based devices are being deployed, not only by traditional research organizations and governments, but also by commercial entities and even individuals as part of the progress towards "an Internet of things".

Unfortunately, a number of factors may lead to high barriers of entry for new business entities that wish to implement applications that utilize signal processing. For example, domain experts have typically been responsible for designing and coding the various signal processing algorithms, and the supply of such experts is often limited. In some scenarios, the hardware and/or software modules implementing the algorithms are customized in such a way that they are not very easy to use, at least by other parties than the original organizations where they were developed. Expensive, special-purpose and/or high-end hardware servers have traditionally been deployed for signal processing in some environments. It may require substantial effort to evaluate the costs and benefits of alternative approaches for a given type of signal processing, and hence to develop and sell services and applications that rely on signal processing techniques.

Figure 1A:
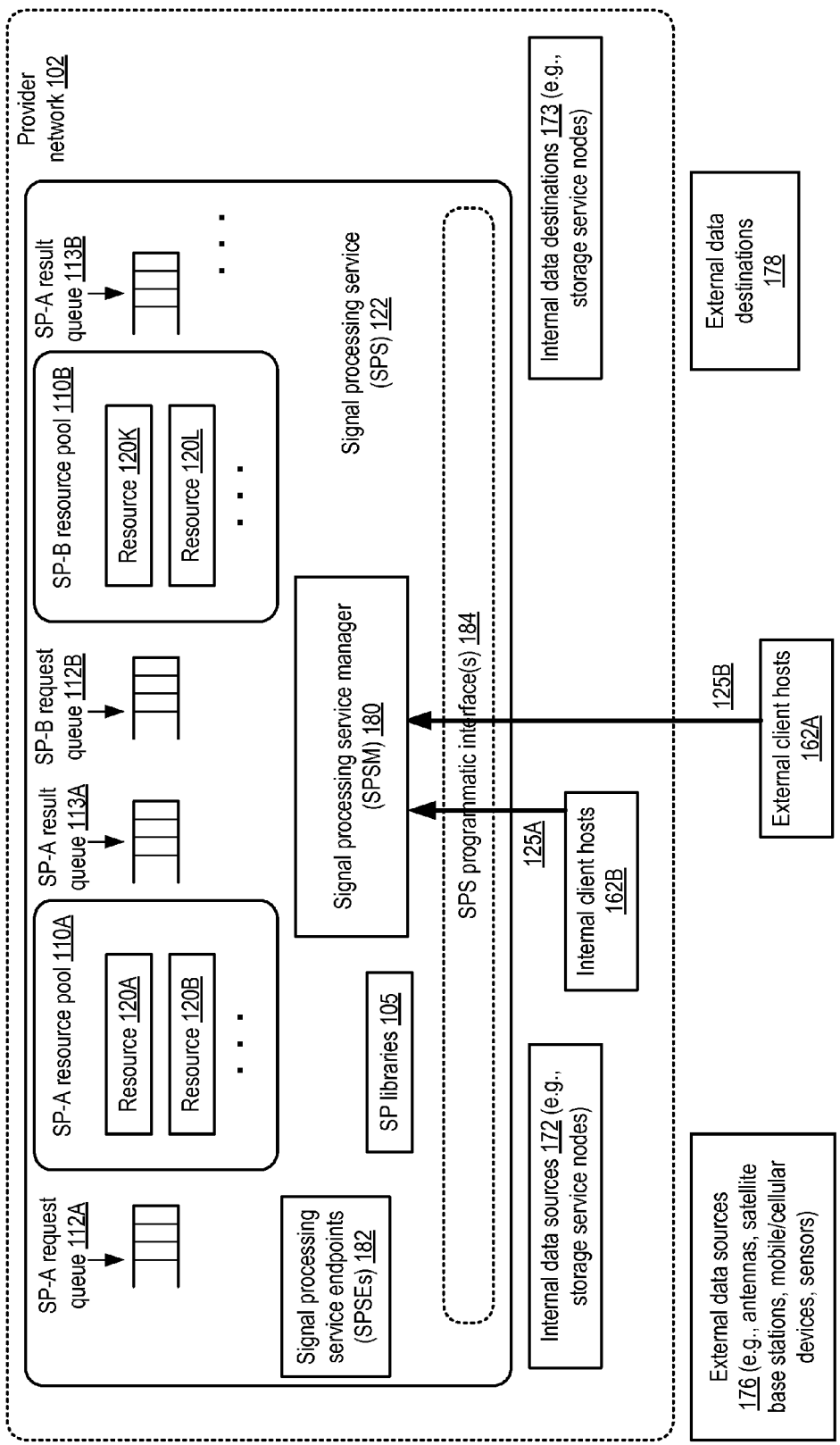
FIG. 1a illustrates an example of a system in which a network-accessible signal-processing service is implemented at a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing a network-accessible signal processing service (SPS) using resources of a provider network are described. The signal processing service may implement easy-to-use programmatic interfaces, such as web services interfaces, that allow clients to specify input sources, algorithms and outputs for various types of signal processing operations. The signal processing service may thus help reduce much of the cost and complexity traditionally associated with deploying signal processing techniques in-house. Networks set up by an entity such as a company or a public sector organization to provide one or more network-accessible services (such as various types of cloud-based computing services including the signal processing service, as well as storage services, database services and the like) accessible via the Internet and/or other networks to a distributed set of clients may be termed provider networks herein. The signal processing service may allow clients to design and implement fairly sophisticated signal processing workflows, in which for example a pipeline or sequence of data transformations may be set up on behalf of clients, and other services of the provider network (e.g., a network-accessible storage service, a service supporting a parallel programming model involving map and reduce phases, a service providing high-end virtualized compute servers, or a load-balancing service) may be used at various stages of the pipeline. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments.

A signal processing service manager (SPSM) may be set up in some embodiments, e.g., using one or more computing devices of the provider network, to coordinate the supported signal processing functions. In at least some embodiments the SPSM may comprise a plurality of physically and/or geographically distributed hardware and/or software modules. The SPSM may implement one or more programmatic interfaces (e.g., web pages or web sites, application programming interfaces (APIs), command-line tools or graphical user interfaces) enabling a client to design, construct, select, instantiate, and/or perform various other operations on signal processing workflows. A given workflow may comprise one or more workflow elements to be implemented at least in part using one or more resources of the provider network, e.g., compute resources, storage resources, networking resources, workload management resources such as load balancers and the like, at least some of which may be obtained from other network-accessible services of the provider network. For a particular workflow element, the programmatic interface(s) of the SPS may enable a client to specify a variety of parameters, such as one or more data sources, one or more processing techniques to be applied to data obtained from the one or more data sources, and one or more data destinations to which processed data is to be directed. The particular processing technique or techniques to be used for a given workflow element may be selectable via the one or more programmatic interfaces in at least some embodiments. According to one embodiment, a client may also specify one or more operational constraints on the implementation of any given workflow element, including for example performance constraints, budget constraints, security constraints, data validity constraints and the like.

Clients may submit requests via the programmatic interface(s) to instantiate or "launch" instances of the workflows in at least some embodiments. That is, a workflow may be created as a template, and numerous workflow instances based on the template, with respective distinct input data sets, may be started up at client request. In response to a request to start a workflow instance, the SPSM may identify, from among the resources of the provider network, one or more specific resources to be deployed to implement a particular processing technique indicated for at least one element of a specified workflow. The specific resources may be selected based at least in part on the operational constraints specified for the workflow. In some embodiments in which clients may have resources of the provider network already assigned to them (e.g., because the clients have reserved resources from another service of the provider network), such pre-assigned resources may be selected for some workflow instances launched on behalf of the client. For example, the client may provide a list of pre-assigned resources to the SPSM, and the SPSM may choose resources from the list, or the client may direct the SPSM to use specified pre-assigned resources. After the resource is selected, the processing technique(s) may be applied to the input data for the workflow element, and the results of the processing may eventually be transmitted to the data destination specified for the workflow element. If the workflow comprises a plurality of elements, e.g., in the form of a pipeline, resources for the remaining elements may be found, and the remaining elements of the workflow may be launched in the appropriate order.

According to some embodiments, any combination of several different types of signal processing techniques may be specified or selected for a given workflow element by a client, or by the SPSM on behalf of a client. A library of different types of signal processing techniques may be available, including in some cases a plurality of different algorithms for a given type of processing, and clients may be able to choose the techniques and/or algorithms to be used for any given workflow element via programmatic interface. For example, supported signal processing techniques in one embodiment may include one or more types of demodulation operations, various types of filtering, modulation operations, image or video processing operations, speech processing operations, fast Fourier transforms, inverse fast Fourier transforms, correlation computations, spatial analyses, beamforming, matrix manipulation operations, and/or compression operations.

Any of several different kinds of data sources and destinations may be specified for a given workflow element in some embodiments. For example, a data source may include one or more antennas (e.g., antenna arrays), cellular/mobile devices, sensors, satellite base stations, digital receivers, radar devices, audio input devices, cameras, or resources of other network-accessible services implemented at the provider network. In some embodiments, the SPS may provide one or more endpoints to which analog signals can be provided as inputs, or to which digital signals derived from the analog data sources (using analog-to-digital converters or digitizers of various kinds) can be provided. In at least some embodiments, programmatic interfaces for input signals (e.g., respective sets of application programming interfaces for different types of signal processing inputs) may be implemented, enabling clients to submit digitized representations of analog input to the service. Data destinations choices may include, for example, a different resource of the provider network (e.g., a storage device of a storage service), either allocated to the same client on whose behalf the workflow is implemented, or allocated to a different client, or a device external to the provider network (e.g., a server set up at a client network or client-owned data center). In some embodiments email addresses, message queues, notification service endpoints, databases, or web sites may be specified as data destinations. In at least some embodiments, local storage devices such as disks at the resource at which a particular processing technique is implemented may be specified as data destinations of the technique, or an in-memory data structure may be chosen as a destination. In some embodiments data output from one workflow element may be fed directly as input to another workflow element via one or more programmatic interfaces, e.g., for a given workflow element, a different workflow element may be considered a data source or a data destination.

In one embodiment, operational constraints associated with a given workflow element may include any combination of (a) a budget limit, (b) a performance timing or throughput constraint, (c) a parallelism constraint (e.g., some types of signal processing operations may be amenable to parallelization, while others may require serial or sequential data flow), (d) a data validation constraint (e.g., correctness criteria for either the input, the output, or both the input and the output), (e) a data security constraint (e.g., encryption or other encoding requirements for input, output or both), (f) a durability constraint for a result of a particular analysis technique (e.g., a requirement that the probability of loss of the result due to any kinds of failures be kept below a threshold), or (g) a notification requirement (e.g., a requirement that the client be notified either in advance of, at various stages during, or upon completion of, the processing associated with the workflow element).

According to some embodiments, a subset of resources of the provider network may be set aside specifically for signal processing. For example, respective pools of hardware and/or software resources that are specifically designed for signal processing, or optimized/tuned for various kinds of signal processing may be set up. When a workflow instance requires signal processing of a particular type, one or more resources from the appropriate signal processing resource pool may be identified and allocated or assigned. When the processing is completed, the resources may be returned to the pool, e.g., for use by another workflow instance.

In at least some embodiments, clients of the SPS may be charged an amount proportional to amount of resources their workflows actually consumed. In such an embodiment, the SPS may be responsible for determining metrics indicating, for example, the amount of computation performed for a given client's workflows, the amount of network traffic associated with implementing the workflows, and/or the amount of storage use associated with implementing the workflows. Billing amounts related to signal processing may be determined based on such metrics. In some embodiments, clients may be allowed to choose from among various pricing policies to be used for their use of the signal processing service. A given pricing policy may indicate, for example, units of computation, storage and networking, and the per-unit pricing for the resources.

According to one embodiment, the SPS may be able to perform certain types of optimizations, or make certain types of choices related to signal processing, on behalf of a client. For example, the SPSM may generate, based one or more optimization objectives and/or on various collected metrics, a recommendation for an alternative workflow to one that is currently being used by the client. If algorithm A is being used for demodulating, and the service has a different, more efficient algorithm B that can be used to generate equivalent results in less time or at a lower cost, the SPSM may provide a recommendation that the client use algorithm B instead of algorithm A. The client may choose to accept or reject the recommendation.

In one embodiment, a client may request the SPS to select the algorithm to be used for a type of signal processing to be performed on data obtained from some specified data source. In such a scenario, the SPSM may identify one or more appropriate analysis techniques, e.g., from a library of supported techniques, based on one or more client-specified criteria indicated in the request. The SPSM may then implement the selected technique. In some cases the SPSM may request approval from the client for the selected analysis technique prior to performing the analysis.

Example System Environment and Signal Processing Applications

FIG. 1a illustrates an example of a system 100 in which a network-accessible signal-processing service (SPS) 122 is implemented at a provider network 102, according to at least some embodiments. As shown, SPS 122 may include a plurality of resources 120 organized into resource pools 110, such as resources 120A and 120B in resource pool 110A, and resources 120K and 120L in resource pool 110B. Each pool of resources may be designated for a respective signal processing technique or a related set of signal processing techniques in the depicted embodiment—e.g., resource pool 110A is configured to implement signal processing technique SP-A, while resource pool 110B is configured to implement signal processing technique SP-B. A variety of different types of resources, including for example computing resources, storage resources, and/or networking resources, may be included in a given resource pool 110 at a given point in time. In some implementations, some or all of the resources in a pool 110 may be specialized or optimized for performing specific types of computations (e.g., special-purpose hardware or software components may be used), while in other implementations, general-purpose or commodity hardware and/or software may be used.

For each of several categories of signal processing, the SPS manager (SPSM) 180 may set up request queues 112 and/or result queues 113 in the depicted embodiment. For example, for signal processing workflow elements in which processing technique SP-A is to be used, request queue 112A may be established. When operations for such a workflow element are to be launched or executed, the SPSM 180 may determine whether sufficient resources in the corresponding SP-A resource pool 110A are available. If sufficient resources are not available, the SPSM manager 180 may in some embodiments determine whether additional resources can be added to the pool, e.g., by requesting such resources from other services of the provider network and/or from other pools of the SPS 122. If additional resources cannot be deployed, a representation of the workflow element (e.g., a workflow element job) may be queued in the request queue 112A until sufficient resources become available in pool 112A. After a given workflow element's SP-A operations are completed, the results of the processing may in some embodiments be stored at least temporarily in result queue 113A. The results may ultimately be consumed, e.g., by a transmission to a data destination specified for the workflow element. Similarly, workflow element operations may be queued for SP-B processing at request queue 112B until sufficient resources become available in resource pool 110B, and results of SP-B operations may be stored in result queue 113B at least temporarily. The SPSM 180 may include a library 105 of different algorithms and techniques for signal processing in the depicted embodiment. Resource pools 110 may be set up for a subset or all of the different types of signal processing techniques included in the library. Respective resource pools 110 may be maintained in one embodiment for demodulation operations, modulation operations, image or video processing operations, speech processing operations, fast Fourier transforms, inverse fast Fourier transforms, correlation computations, matrix manipulation operations, compression operations, and so on. In some embodiments, resource pools may be set up for the more frequently used signal processing techniques, while for other techniques, resources may be identified on an as-needed basis from other network-accessible services of the provider network. The set of signal processing techniques for which resource pools are maintained, and/or the membership of the resource pools, may change over time in at least some embodiments.

The SPSM 180 may implement one or more programmatic interfaces 184, such as APIs, web pages, GUIs, and/or command-line tools, enabling clients of the SPS to design, define, view, modify, delete, launch, pause, or stop signal processing workflows, query workflow status, and so on. The interfaces may be invoked from external client hosts 162A (e.g., servers external to the provider network, at client premises) as well as internal client hosts 162B (e.g., virtualized compute servers of the provider network that are allocated to clients) in the depicted embodiment. In at least some embodiments, programmatic interfaces may also be provided to enable clients to transmit representations of the input signals to be analyzed/processed using resources of the SPS.

Some data sources 176 (such as antennas, mobile devices, cellular devices, satellite base stations, sensors and the like) of signal processing workflow elements may be located outside the provider network, while other data sources 172 (e.g., data sets written to storage service nodes) may be within the provider network. Similarly, some data destinations 173 may lie within the provide network, while other data destinations 178 may be located on client-managed premises or third-party premises outside the provider network 102. The SPS 122 may establish a set of endpoints (SPSEs) 182 in some embodiments specifically for receiving data from external data sources 176. For example, an SPSE 182 may comprise a server at an edge node of the provider network, where direct links from third-party network providers or client networks to the provider network can be established. In some embodiments, the SPS 122 may provide appliances that can be installed on client premises or in the vicinity of client-managed analog devices, such that, using such an appliance, representations of the collected analog signals can be sent for further processing to other resources of the SPS 122. In at least some embodiments, the provider network 102 itself may include a set of analog resources such as antenna arrays or sensors, or the operator of the provider network may establish a business partnership with other organizations that gather signals from satellites, antennas, sensors and the like. In such scenarios, clients may be able to collect data from the analog resources or the business partners for their signal processing applications.

Clients of the SPS 122 may submit workflow creation requests via the programmatic interfaces 184 in the depicted embodiment, specifying the types of signal processing techniques to be used for the workflow elements, the data source or sources for the elements, the data destinations for the elements, and any operational constraints that are applicable to the elements or to the workflow as a whole. Clients may also use the programmatic interfaces 184 to submit workflow implementation requests, i.e., requests to launch, pause or stop specific instances of previously-defined workflows, as well as requests to monitor or obtain the status of executing workflow instances. In response to a workflow launch request, the SPSM may identify, for one or more workflow elements, the resources that are to be assigned, or the queues into which the workflow element's jobs are to be placed. As processing for the elements of a given workflow proceeds, the SPSM may keep track of the status, and depending on the notification requirements indicated in the operational constraints of the workflow, the client on whose behalf the workflow is being executed may be informed of the progress being made.

For some workflow elements, clients may specify high-level objectives, and allow the SPSM 180 to determine the specific technique or algorithm to be employed. For example, the client may indicate that a data source includes modulated audio, and the SPSM 180 may identify, on behalf of the client, a specific demodulation technique to be used. In at least some embodiments, e.g., based on collected metrics and/or a history of similar workflows, the SPSM may be able to recommend alternative processing techniques to those initially selected by the client. For workflows that involve interactions with other services of the provider network, e.g., workflows that require storage space from a storage service or a database service, the SPSM 180 may be responsible for coordination among the services in at least some embodiments.

In some embodiments, the SPSM 180 may be configured to track resource usage (including usage of resources of other services) of various workflow-related operations performed on a client's behalf, and eventually determining the billing amounts to be charged to the client. The SPSM 180 may allow clients to select from among several supported pricing policies in some embodiments—e.g., policies that allow clients to reserve signal processing resources for long terms at relatively lower costs, or policies in which resources are acquired on demand at a potentially higher cost.

Figure 1B:
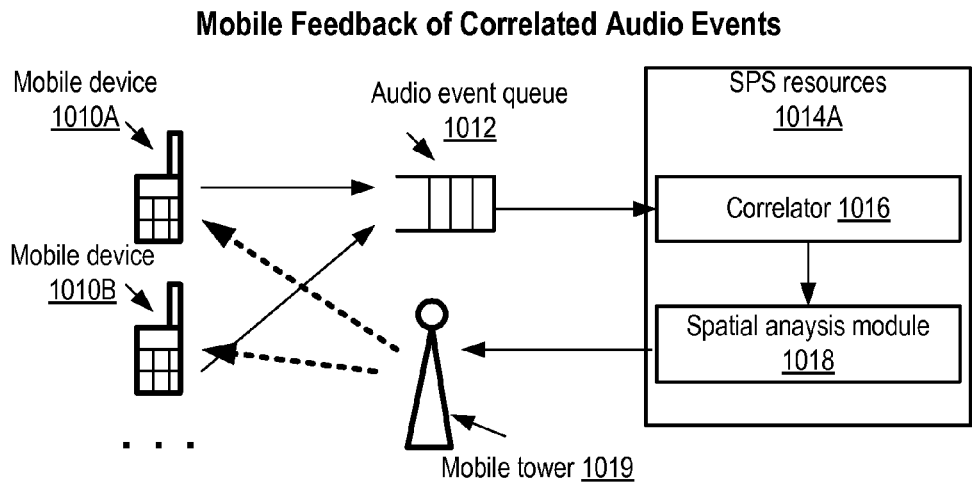
FIGS. 1b, 1c and 1d respectively illustrate three examples of signal processing applications that may be implemented using resources of the signal processing service, according to at least some embodiments.
Figure 1C:
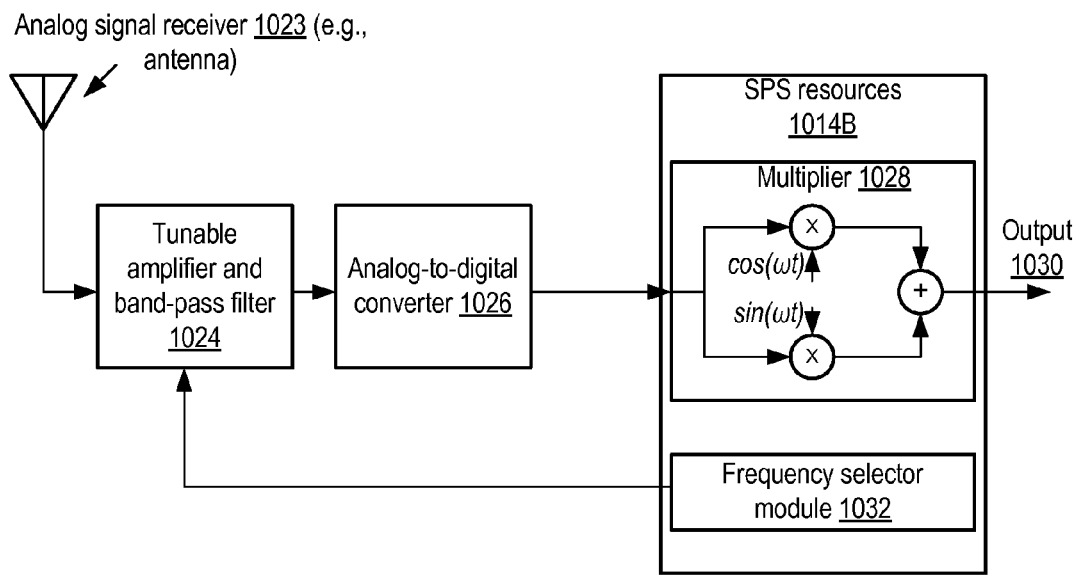
Figure 1D:
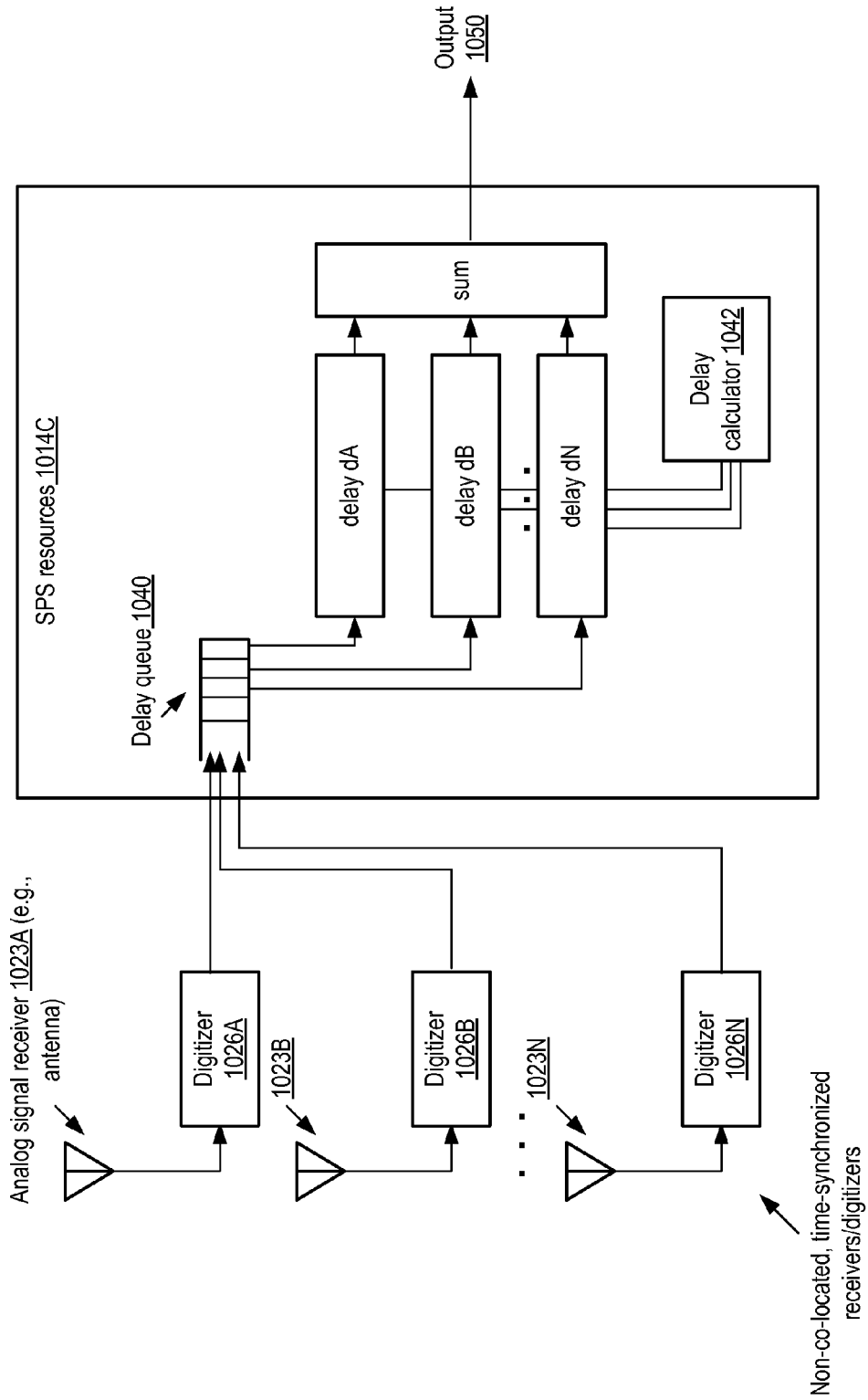

FIGS. 1b, 1c and 1d respectively illustrate three examples of signal processing applications that may be implemented using resources of the signal processing service, according to at least some embodiments. FIG. 1b illustrates an application involving mobile feedback of correlated audio events. As shown, digitized representations of audio events produced by mobile devices 1010 (e.g., mobile phones 1010A and 1010B) may be stored in an audio event queue 1012 for correlation and spatial analysis using resources 1014A of the signal processing service. Correlator 1016 may analyze the enqueued audio events, identifying correlated portions of audio, and pass on its findings for further spatial analysis by module 1018. Clients may be able to utilize well-known algorithms for correlation and spatial analysis available in the libraries of the signal processing service, and deploy the selected algorithms on compute resources of the service, paying only for the durations that the resources are actually used, for example. In at least some embodiments, it may also be possible to perform at least some of the signal processing functionality on the mobile devices themselves, e.g., in the form of a mobile phone "app" or a tablet application. The output of the spatial analysis may be used for various purposes, e.g., to improve the quality of the mobile signals received by the mobile devices 1010 from mobile towers 1019 or other cellular stations.

In FIG. 1c, a binary amplitude shift key (ASK) demodulation application is illustrated. Amplitude shift keying is a well-known form of amplitude modulation, in which digital data is represented as variations in the amplitude of a carrier wave. As shown, an analog signal at a receiver 1023 (such as an antenna) may be passed through a tunable amplifier and band-pass filter combination 1024 and then through an analog-to-digital converter 1026. The digitized output may be transmitted to a resource 1014B of the signal processing service where it is demodulated using a multiplier 1028 to produce output 1030 (which may in turn be fed to another signal processing workflow, for example). Frequency selector module 1032, also implemented using service resources, may be used to specify tuning parameters for the amplifier/band-pass filter. In some implementations, the amplifier and band-pass filter, as well as the A-to-D converter, may also be implemented using the signal processing service, while in other implementations those components may be incorporated within devices external to the provider network.

FIG. 1d illustrates a delay-and-sum beamforming application. Beamforming is a signal processing technique that may be used with receiver arrays of various types (e.g., sensor arrays, microphone arrays, or antenna arrays) for directional signal transmission or reception. Beamforming may be used, for example, to strengthen a received signal combined from a plurality of spatially distributed, non-co-located receivers. As shown, input from a plurality of non-co-located time synchronized receivers 1023A 1023B, . . . 1023N with respective digitizers 1026A, 1026B, . . . 1026C may be stored in a delay queue 1040 implemented using signal processing service resources 1014C. A delay calculator 1042 (also implemented using SPS resources) may determine the delays dA, dB, . . . , dN to be applied to queued entries, and the delayed entries may then be summed using the service resources to produce the output 1050. It is noted that while FIGS. 1b, 1c and 1d illustrate examples of the capabilities of the signal processing service, a large number of other types of signal processing applications may be implemented in various embodiments, instead of or in addition to those shown in these figures.

SPS Manager Components

Figure 2:
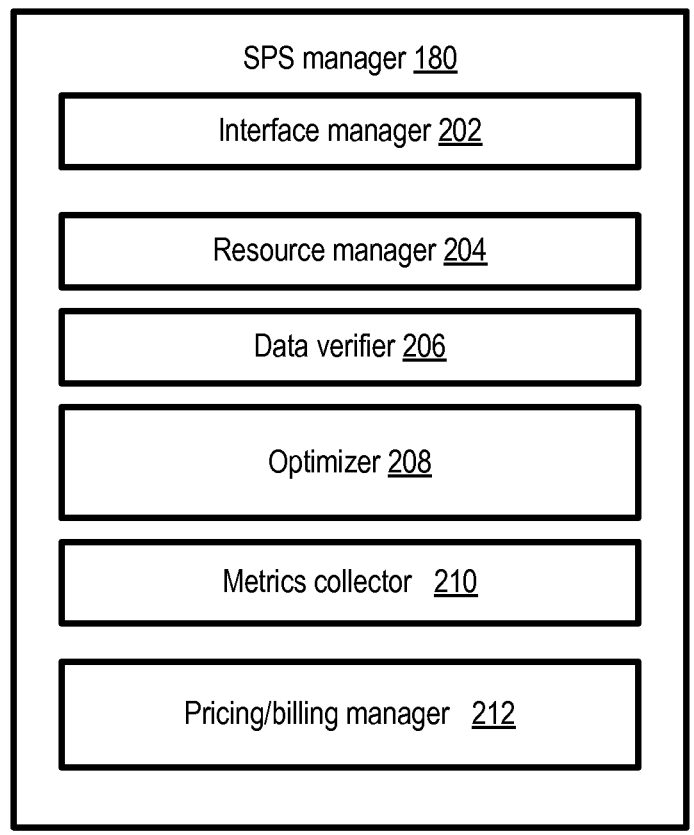
FIG. 2 illustrates example components of a signal processing service manager, according to at least some embodiments.

FIG. 2 illustrates example components of a signal processing service manager 180, according to at least some embodiments. As shown, the SPSM 180 may include an interface manager 202 configured to implement the programmatic interfaces 184 used by clients to submit workflow-related requests, such as the workflow creation, launch and status requests illustrated in FIG. 3. In some embodiments, as noted earlier, clients may be able to programmatically transmit representations of the input signals to be processed during at least some types of workflows, using interfaces implemented by the interface manager. The interface manager 202 may also be responsible for implementing other interfaces and interactions that may not be client-accessible in some embodiments, such as interactions with other services of the provider network, interactions with administrators of the SPS 122, and so on.

Resource manager 204 may be responsible for maintaining the resource pools 110 for various types of signal processing operations in the depicted embodiment. The resource manager 204 may acquire computing, storage, networking and/or other resources from other services as needed, assign the resources to workflow elements, and return or release resources to other services depending on the demand. In some embodiments, the resource manager 204 may also be responsible for maintaining the request queues 112 and the result queues 113 for various signal processing techniques. For some types of signal processing techniques, pools of resources may not be set up in advance; instead, resources may be acquired by the resource manager on an as-needed basis. In some embodiments, some clients may be able to reserve signal processing resources for long periods (e.g., weeks, months or years), and in such scenarios the resource manager 204 may manage such resource reservations as well.

For some types of signal processing workflow elements, the operational constraints specified by the clients may include data verification constraints. For example, the data being received from a specified data source may have to be in a certain format, or may have to meet specified statistical properties. Similarly, data produced as output from the signal processing algorithm may have to be in a particular format or meet other criteria. A data verifier component 206 of the SPSM 180 may be responsible for confirming that input and/or output data of a workflow element meets the verification constraints in some embodiments.

Optimizer 208 may be responsible for determining efficient ways to achieve various signal processing goals in the depicted embodiment. For example, if there are several alternative algorithms that may be used to perform a given type of signal processing computation, or if several different resources are available, the optimizer may determine the best combination of algorithm and resources to achieve a desired objective, such as minimizing the time taken, or minimizing the total cost to the client. Optimizer 208 may generate recommendations for clients, indicating alternative approaches or techniques that may be more cost-effective than the approached currently planned. In some embodiments, optimizer 208 may maintain a history of previous workflow operational metrics and results, and use the history when identifying the optimal techniques or resources. Artificial intelligence techniques may be employed to enable the optimizer 208 to improve its recommendations and decisions over time in some embodiments.

Metrics collector 210 may be configured to gather statistics from various resources of the signal processing service (and/or from other services of the provider network) over time, which may be used by the resource manager, the optimizer, or the pricing/billing manager for performing their respective functions. Pricing/billing manager 212 may be responsible for implementing the pricing policies, such as on-demand or reservation-based pricing, on the basis of which client billing amounts are computed in the depicted embodiment. In one embodiment, the components of the SPSM 180 may be implemented in a distributed manner, e.g., a plurality of hardware and/or software components may be used. In some embodiments, one or more of the components illustrated in FIG. 2 may not be implemented, and/or other components than those shown in FIG. 2 may be included in the SPSM 180.

Client-SPSM Interactions

Figure 3:
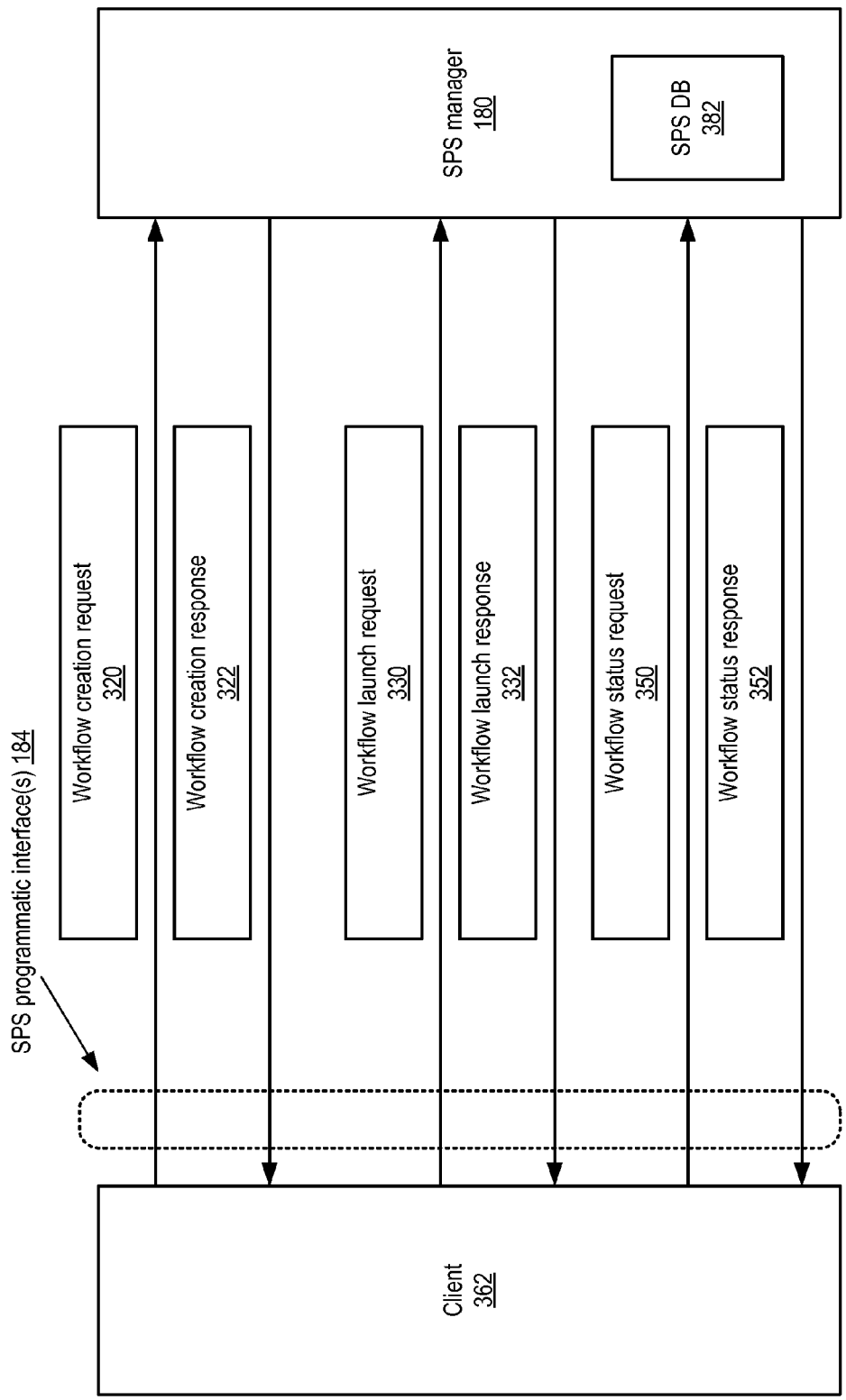
FIG. 3 illustrates example interactions between a client and a signal processing service manager, according to at least some embodiments.

FIG. 3 illustrates example interactions between a client 362 and a signal processing service manager 180, according to at least some embodiments. The client may submit requests for various types of signal processing operations, and receive responses to the requests, via the programmatic interfaces 184 implemented by the SPSM 180 in the depicted embodiment. For example, a client may submit a workflow creation request 320, specifying one or more signal processing workflow elements, the data sources and destinations for those elements, and operational constraints on the elements and/or on the workflow as a whole. In response, the SPSM 180 may provide a workflow creation response 322, indicating for example whether the workflow was successfully created or not, providing an identifier for the created workflow that the client may use to request a launch of an instance of the workflow, and so on.

The client 362 may submit a workflow launch request 330 via the programmatic interface 184. In response, the SPSM 180 may identify the initial workflow element(s) to be started, and select resources or resource pools to be used for the initial workflow elements. In some embodiments, the SPSM may add representations of the initial workflow elements to one or more request queues 112. In at least one embodiment, the SPSM may validate that data with the expected format and properties is being generated by the data sources specified for the initial workflow elements. A response 332 to the workflow launch request may be provided to the client, indicating for example that the workflow element or elements have been queued or have been started, and/or that the input data source for the element(s) has been validated.

Some workflows, especially those that include several sequential workflow elements, may take relatively long times to complete. In some cases, the operational constraints specified for the workflows may include notification requirements, in accordance with which the client 362 may be notified as the workflow instance passes through various phases. Regardless of whether notification requirements are specified, in the depicted embodiment the client 362 may submit workflow status requests 350 to the SPSM 180 via the programmatic interfaces 184, and the SPSM 180 may provide the current status of specified workflows back to the client in status responses 352. Various other types of workflow management interactions may be supported in different embodiments, including, for example, operations to view or modify workflow definitions, operations to pause or stop workflows, and so on.

Workflow Definition Interfaces

Figure 4:
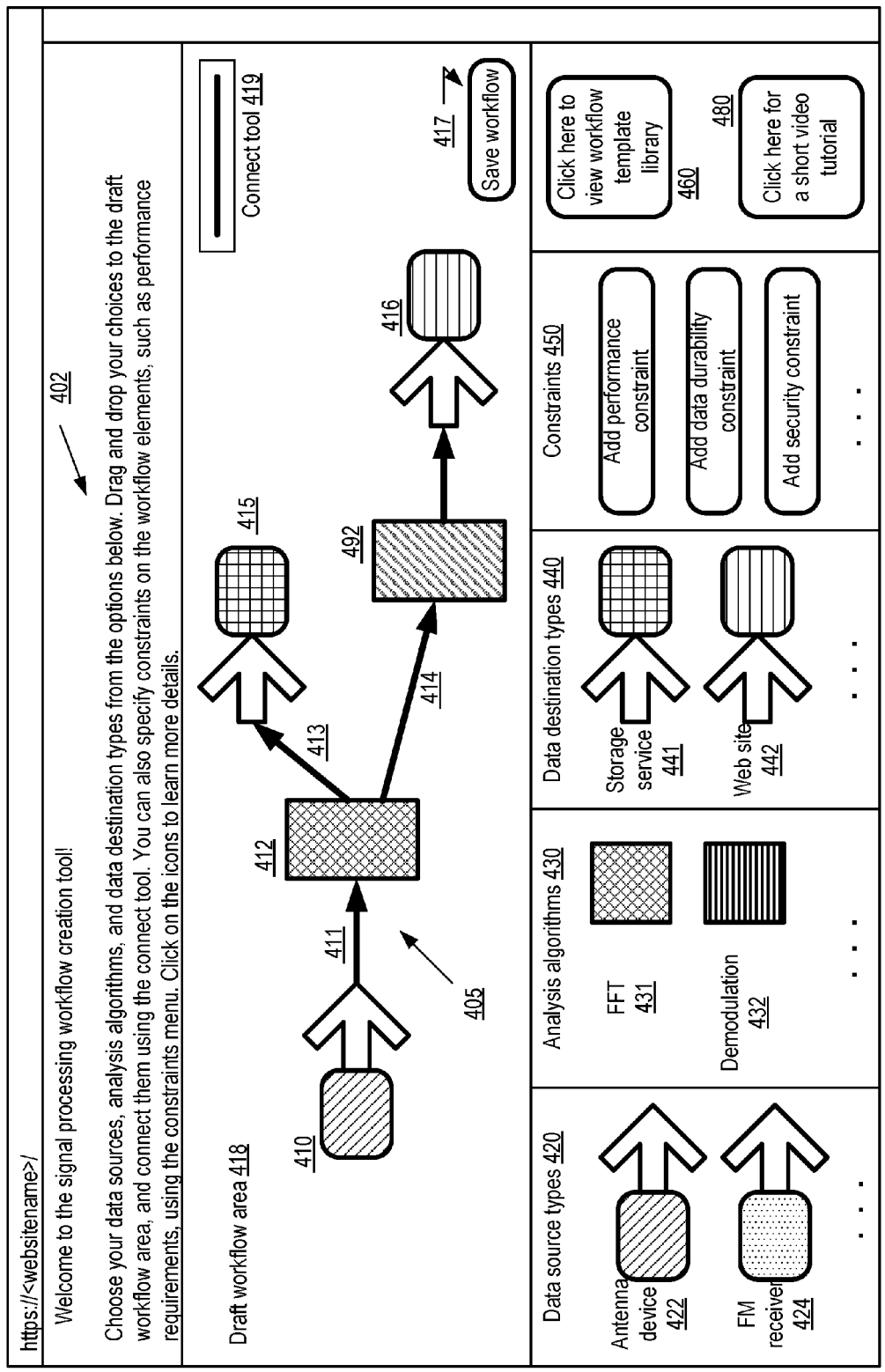
FIG. 4 illustrates an example of a web-based programmatic interface that may be implemented to enable clients to design signal processing workflows, according to at least some embodiments.

FIG. 4 illustrates an example of a web-based programmatic interface that may be implemented (e.g., by SPSM 180) to enable clients to design signal processing workflows, according to at least some embodiments. As shown, the interface may include a web page 400 that includes a message area 402 with a high-level overview of the features of the interface, and a draft workflow area 418 in which a client may construct or define various aspects of a signal processing workflow 405.

Web page 400 may include several sections from which the client may select data sources, analysis algorithms, destinations and the like for various workflow elements. For example, in the depicted embodiment, a client may drag and drop a symbol of a data source type such as an antenna device 422, an FM receiver 424, and the like from data source type section 420 into the draft workflow area 420, and connect the data source type to a corresponding workflow element using connector tool 419. Similarly, the signal processing techniques or algorithms for a given workflow element (such as FFT (fast Fourier transform 431 or demodulation 432) may be selected from analysis algorithm section 430, and the data destination type or types (such as a storage service node 441 or a website 442) may be selected from destination types section 440. Operational constraints such as performance constraints, data durability constraints, security constraints and the like may be assigned to various workflow elements or to the workflow 405 as a whole using constraints section 450. In some embodiments, tutorials may be provided (e.g., a s result of the client clicking on button 480) to help clients learn about the features of the signal processing service. In the depicted embodiment, a set of workflow templates may be made accessible to clients, e.g., for possible customization by the clients to suit their specific signal processing application needs. Clients may access a template library using button 460, for example.

In the example workflow 405 depicted in FIG. 4, data source 410 has been chosen for a workflow element 412, as indicated by arrow 411. Two destinations have been identified for the output produced by element 412, as indicated by arrows 413 and 414—destinations 412 and 492. The output of element 412 is further analyzed/processed at element 492, and the output of the processing at element 492 is to be transmitted to destination 416. Clients may be able to design fairly sophisticated signal processing pipelines, including parallel branches and serial execution steps, using the kinds of featured illustrated in FIG. 4. For each of the steps, clients may specify details (e.g., network addresses of the data sources and destinations, expected data set sizes, and the like), using other controls of the interface in the depicted embodiment. Save workflow button 417 may be used to store a persistent representation of the signal processing workflow 405 in a repository maintained by the SPSM 180. Other web-based interfaces may be implemented to allow clients to launch workflows, view workflow status, and so on. It is noted that other interfaces features associated with designing and defining workflows may be implemented in various embodiments than those illustrated in FIG. 4. In some embodiments, equivalents of the web-based interactions illustrated in FIG. 4 may be performed using APIs or other interfaces.

Methods for Signal Processing Service Operations

Figure 5:
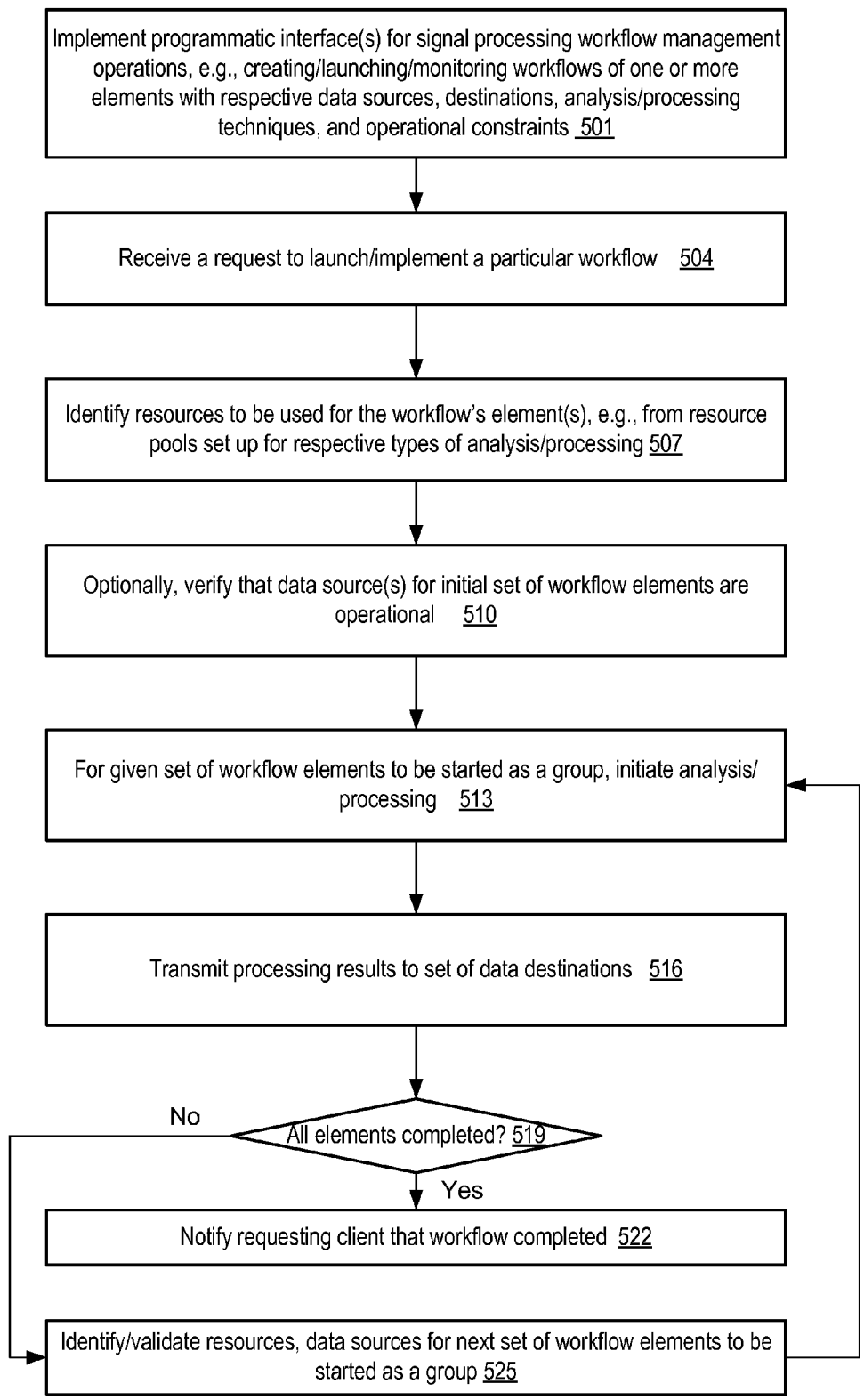
FIG. 5 is a flow diagram illustrating aspects of operations that may be performed to implement a network-accessible signal processing service, according to at least some embodiments.

FIG. 5 is a flow diagram illustrating aspects of operations that may be performed to implement a network-accessible signal processing service, according to at least some embodiments. As shown in block 501 of FIG. 5, one or more programmatic interfaces (e.g., web-based interfaces similar to that shown in FIG. 4, APIs, command-line tools, or other GUIs) may be implemented, to enable clients to create, launch, provide representations of input signals for, control the progress of, and monitor signal processing workflows. A given workflow may include one or more workflow elements, each with a specified set of data sources, analysis/processing algorithms or techniques, and data destinations. Operational constraints may be specified, either for the workflow elements, or for the workflow as a whole, via the programmatic interfaces.

Clients may specify various types of data sources, destinations, algorithms and constraints in different embodiments. Data sources may include, for example, mobile or cellular devices, individual or groups of antennas, sensors, satellite base stations, digital receivers, radar devices, audio input devices, cameras, or resources of other network-accessible services implemented at the provider network. In some implementations, the analog device(s) that produce the analog input data may not necessarily be specified as part of a given workflow definition. Instead, for example, the invocation of an API that submits a digitized representation of the analog input, by a client program or an appliance installed at client premises may serve as a data source from the perspective of the service in such an implementation. Algorithm choices may be supported for, among others, various types of demodulation operations, modulation operations, image or video processing operations (including gradient descent, erode, or waterfall techniques), speech processing operations, fast Fourier transforms, inverse fast Fourier transforms, correlation computations, filtering operations, beamforming applications, spatial analysis operations, matrix manipulation operations, and/or compression operations. Data destinations choices may include, for example, a resource of the provider network (e.g., a storage device of a storage service), either allocated to the same client on whose behalf the workflow is to be implemented, or allocated to a different client, or a device external to the provider network (e.g., a server set up at a client network or client-owned data center). In some embodiments email addresses, message queues, notification service endpoints, databases, or web sites may be specified as data destinations. In at least some embodiments, local storage devices such as disks at the resource at which a particular processing technique is implemented may be specified as data destinations of the technique, or an in-memory data structure may be chosen as a destination. In some embodiments data output from one workflow element may be fed directly as input to another workflow element, e.g., for a given workflow element, a different workflow element may be considered a data source or a data destination. In one embodiment, a service that allows human users to bid for or sign up for small-scale work projects, such as a task marketplace, may be selectable as a data destination—for example, output from a particular element of the signal processing application may be verified or analyzed by humans.

In one embodiment, operational constraints associated with a given workflow element may include any combination of client-specified cost or budget limits, performance requirements (e.g., response time requirements or throughput requirements), parallelism constraints (e.g., some types of signal processing operations may be amenable to parallelization, while others may require serial or sequential data flow), data validation constraint (e.g., correctness or formatting criteria for either the input, the output, or both the input and the output), security constraints (e.g., encryption or other encoding requirements for input, output or both), durability constraints for a result of a particular analysis technique (e.g., a requirement that the probability of loss of the result due to any kinds of failures be kept below a threshold), or notification requirements (e.g., a requirement that the client be notified either in advance of, at various stages during, or upon completion of, the processing associated with a workflow element or the workflow as a whole).

Clients may design or construct workflows using the programmatic interfaces. A request to instantiate or launch an instance of a specified workflow may be received (block 504 of FIG. 5), e.g., by the SPSM 180. Depending on the design of the workflow, only a single workflow element may have to be started to launch the workflow instance, or multiple workflow elements may have to be started in parallel. The set of one or more workflow elements to be started first may be termed the "initial set" of workflow elements. The SPSM 180 may identify the specific resources to be used for at least the initial set of elements of the workflow, for example, from the resource pools 110 established for the type of signal processing techniques to be used for the initial set (block 507). In some embodiments, as noted earlier, resource pools may not be set up for at least some signal processing techniques. Instead, in such embodiments, resources may be obtained on an as-needed basis from a general pool or from other services of the provider network. In embodiments in which clients are allowed to reserve signal processing resources, the SPSM may first attempt to find the required resources in the client's reserved resources, and only utilize other pools or services if the client's reserved resources are insufficient.

The SPSM 180 may optionally validate that the data sources specified for the initial set of workflow elements are operational (block 510), e.g., that data is being produced in the expected format. For some workflows, the operational constraints may require the SPSM 180 to validate the data sources, while in other embodiments, the SPSM 180 may have the option of not validating the data sources. Analysis or processing may then be started on the data obtained from the data sources for the set of workflow elements that are to be started in parallel or as a group (block 513). Results of the processing may be transmitted to the specified data destinations (block 516). For some workflow elements, results may be streamed to the data destinations as soon as any results become available, e.g., in accordance with parameters specified by clients for the workflow. For other workflow elements, results may be accumulated (e.g., in result queues 113) and only transmitted to the destinations when the processing is completed for a given workflow element.

After a given workflow element or a set of parallel workflow elements completes, the SPSM may determine whether any elements remain to be executed in the parent workflow, as detected in block 519. If no elements remain, the client may be notified that the workflow instance has completed (block 522). If elements remain, the next set of one or more workflow elements to be started as a group may be identified, the corresponding resources may be selected, and the data sources may be validated (block 525). Operations corresponding to blocks 513 onwards may then be initiated for this next set of workflow elements in the depicted embodiment, until eventually all the elements of the workflow are completed.

Figure 6:
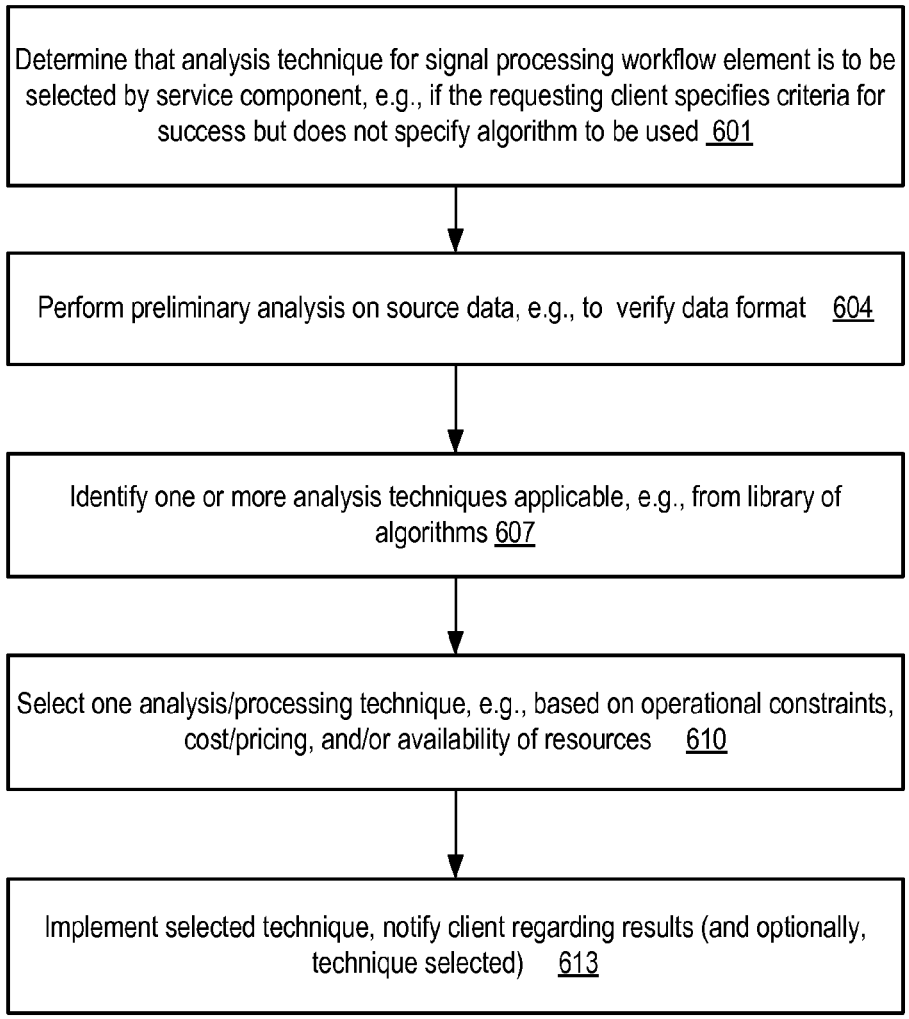
FIG. 6 is a flow diagram illustrating aspects of operations that may be performed by a signal processing service to select a processing technique for a workflow element, according to at least some embodiments.

As noted earlier, in some embodiments clients may allow the SPSM to choose the specific signal processing algorithm or routine to be employed for one or more workflow elements. FIG. 6 is a flow diagram illustrating aspects of operations that may be performed by a signal processing service to select a processing technique for a workflow element, according to at least some embodiments. As shown in block 601, the SPSM 180 may determine e.g., based on an indication in the workflow definition or in response to an algorithm selection request regarding a particular workflow instance or workflow element from the client, that the service is to select the algorithm or routine to be used to for a workflow element. The client may, for example, indicate one or more criteria for successful processing of the input data for the workflow element (e.g., some expected mathematical properties expected from the output), but may set a parameter such as "service-selected-algorithm" to "true" to indicate to indicate that the client expects the service to choose the algorithm. The SPSM 180 may perform preliminary analysis on the data from the specified data source (block 604), e.g., to verify that the data is in an intelligible format.

The SPSM may then identify one or more algorithms in its library of signal processing routines that are appropriate for the input data (block 607). The SPSM may, for example, build up a knowledge base over time that enables it to match different types of input data to respective sets of signal processing routines. If more than one algorithm is available, the SPSM may choose one particular algorithm (block 610), e.g., based on factors such as operational constraints that the client may have specified, the availability of resources suitable for that type of technique, cost/pricing, and so on. The selected technique may then be implemented (element 613), and at least in some embodiments the client may be notified regarding the results and/or the specific algorithm that was selected. The ability to let the service select the algorithm, instead of having to specify the algorithm for each and every workflow element, may allow clients to benefit from the experience and knowledge accumulated by the SPSM 180 over time. In at least some cases, it may be possible for the service to select a particular optimized implementation of an algorithm of which the client may not even have been aware, which may result in faster and/or cheaper analysis than may have been possible had the client been required to specify the algorithm.

Figure 7:
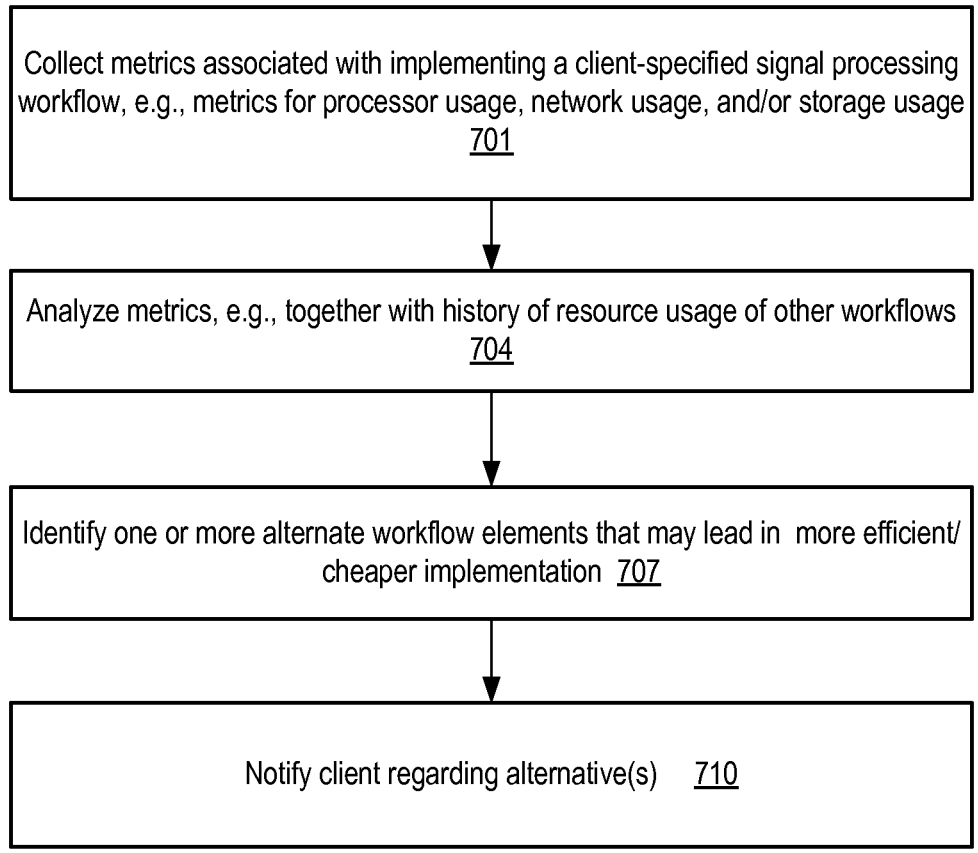
FIG. 7 is a flow diagram illustrating aspects of operations that may be performed by a signal processing service to identify an alternative processing technique that may be used for a signal processing workflow, according to at least some embodiments.

In some embodiments, a component such as optimizer 208 may be able to analyze the relative performance of different approaches to a particular type of signal processing, and in some cases find alternative techniques to those specified by clients. FIG. 7 is a flow diagram illustrating aspects of operations that may be performed by a signal processing service to identify an alternative processing technique that may be used for a signal processing workflow, according to at least some embodiments. As shown in block 701, the SPSM 180 (e.g., using its metric collector component 210) may collect metrics for various resources used for implementing a client-specified workflow, including for example computing, storage and/or networking resources. The SPSM may thus be able to determine, for a given combination of source data set size and algorithm implementation, the amount of computing cycles it took to analyze the data, the number of storage operations that were required, the total storage space used, the amount of network traffic generated, and so on. The collected metrics may be analyzed (block 704) and compared with metrics for other workflows or other algorithms. In at least some cases, it may be possible for the SPSM to identify an alternative technique that is more efficient, e.g., in cost or in time (block 707). In such scenarios, the client may be notified regarding the more efficient alternative approach (block 710), e.g., in the form of a recommendation that the client should change the algorithm specified for future instances of the workflow, or that the client could let the service decide the algorithms for a future instance of the workflow. The SPSM may gradually build up its knowledge base regarding the resource usage characteristics of different algorithms, leading to more useful recommendations over time.

Figure 8:
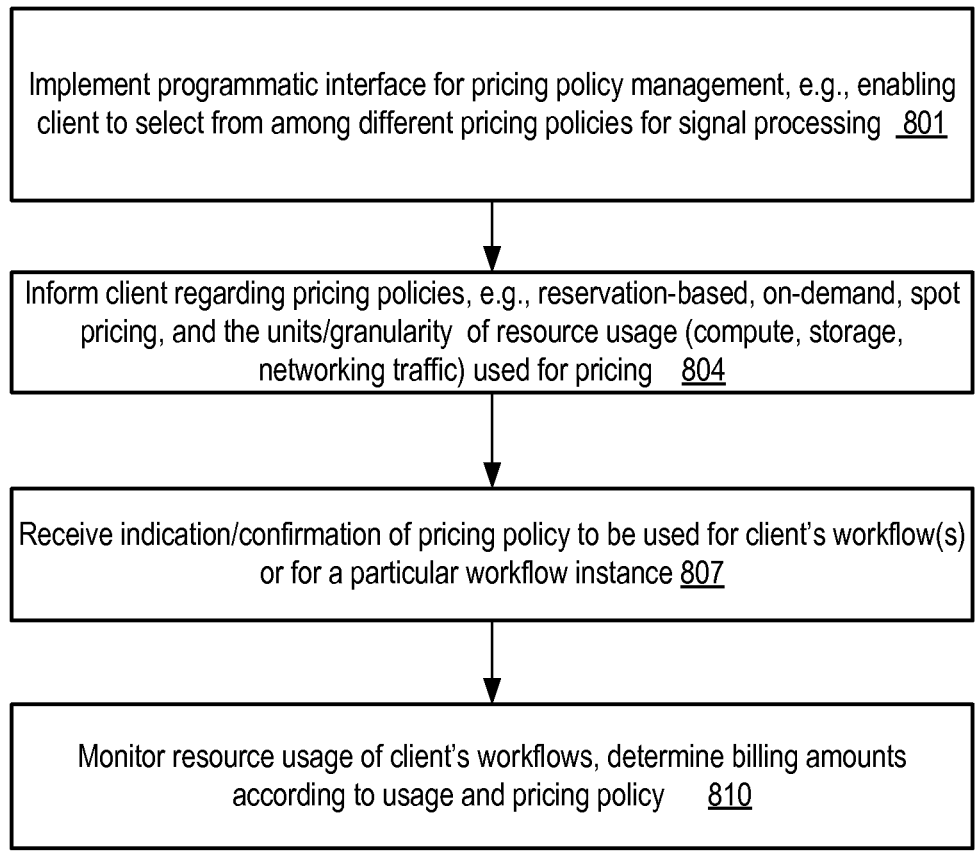
FIG. 8 is a flow diagram illustrating aspects of operations that may be performed to enable clients of a signal processing service to select pricing policies, according to at least some embodiments.

In at least some embodiments, clients may be given the option of choosing from among a plurality of different pricing policies for their use of the signal processing service. The different pricing policies may differ from each other, for example, in the manner in which resources are allocated— e.g., whether signal processing servers are assigned to a given client for long-term reservations or on demand, and/or in the units in which resources are priced. FIG. 8 is a flow diagram illustrating aspects of operations that may be performed to enable clients of a signal processing service to select pricing policies, according to at least some embodiments. As shown in block 801, one or more programmatic interfaces, such as web pages or sites, APIs, and the like may be implemented for pricing policy management. The interface(s) may be used to inform clients regarding various aspects of the supported pricing policies for different types of signal processing techniques, including the resource allocation models, the granularities/units at which resources are priced (e.g., the respective billing rate per CPU-second of compute time, per read or write storage operation or per megabyte of storage used, per megabyte of data transferred, and so on) (block 804). In at least some implementations, respective families of pricing policies may be supported for different types of signal processing—e.g., one set of pricing policies may be available for demodulation algorithms, another set of pricing policies may be specific to FFT algorithms, and so on. In some embodiments, a client may have several options regarding resource assignment terms—e.g., resources for a particular type of signal processing technique may be reserved for terms as long as months or years, acquired on demand for a fixed per-unit price, or acquired in a spot marketplace in which resource prices vary dynamically based on supply and demand.

The SPSM may receive an indication or confirmation of the pricing policy to be used for a client's workflows (block 807), e.g., via one of the programmatic interfaces. The selection of the pricing policy may be made by a client either for all the workflow instances corresponding to a given workflow definition, or on a per-instance basis. As shown in block 810, the resource usage associated with each client's workflow instances may be tracked and monitored, and billing amounts based on the monitored usage and the selected pricing policies may be determined.

It is noted that not all the operations illustrated in the flow diagrams of FIGS. 5, 6, 7 and 8 may be implemented in some embodiments, and some operations may be performed in a different order than shown. Additional operations may be performed in some embodiments than are illustrated in FIG. 7 and FIG. 8.

Use Cases

The techniques described above, of providing signal processing capabilities via a network-accessible service, may be useful in a variety of different scenarios. For example, in some environments, a business entity may need a limited amount of signal processing capabilities, and may not wish to invest in the expensive infrastructure that may typically be required. Such businesses may be able to make use of signal processing service pricing policies that allow them to pay only for the resources they actually use. Clients that require extensive amounts of signal processing may be able to reserve resources optimized for their chosen types of algorithms at inexpensive rates. In some cases, as the size of its library of algorithms and its knowledge base regarding the effectiveness of different algorithms increases, the service may even be able to select more cost-effective and efficient approaches to solve clients' signal processing needs than could have been identified by the clients themselves.

Illustrative Computer System

Figure 9:
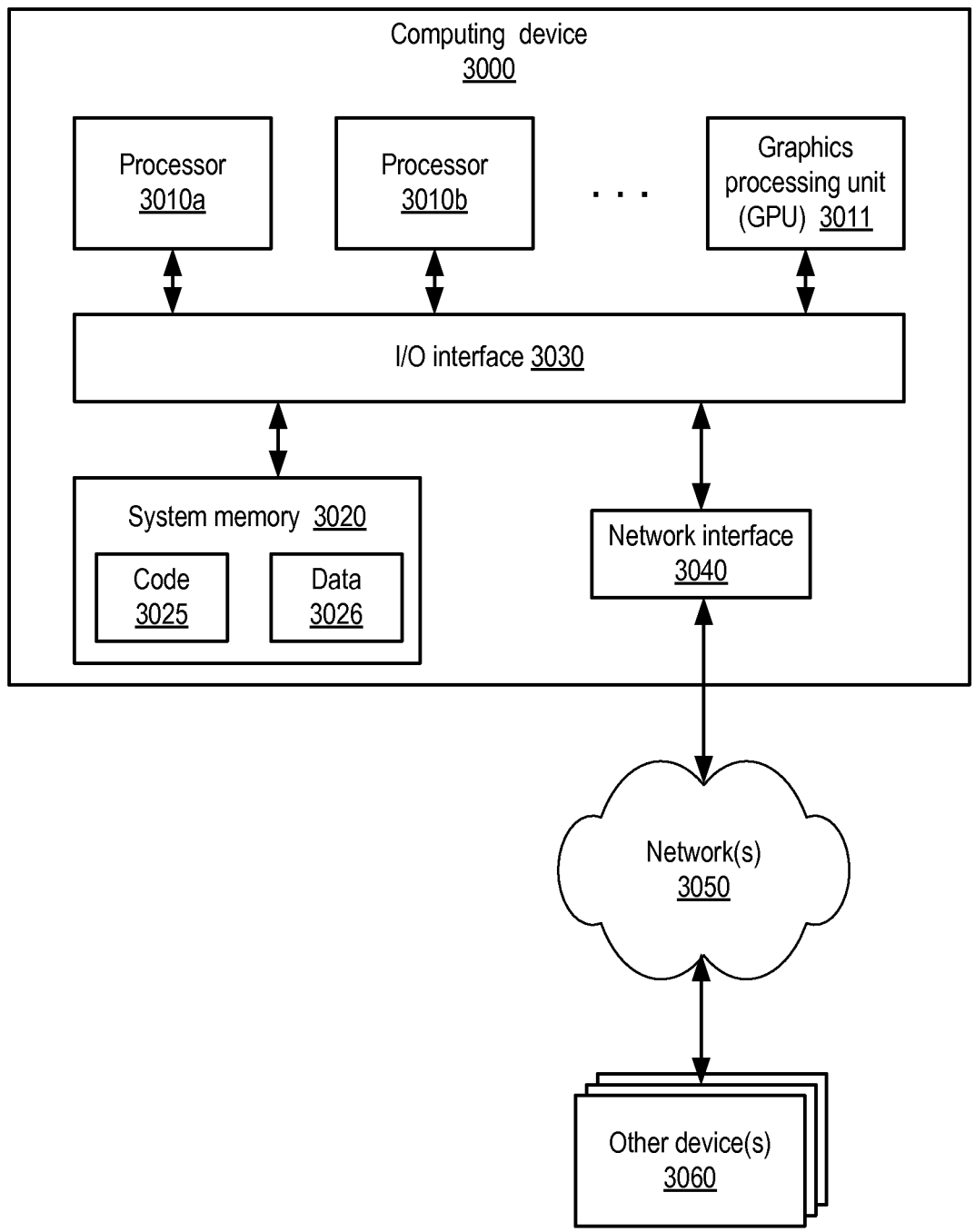
FIG. 9 is a block diagram illustrating an example computing device that may be used in at least some embodiments.

In at least some embodiments, a server that implements a portion or all of one or more of the technologies described herein, including the techniques to implement signal processing service managers, resource pol members, input and output queues for resource pools, as well as other components of signal processing services, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. In at least some embodiments, one or more graphics processing units (GPUs) 3011 or other types of specialized processing units appropriate for signal processing applications may be used instead of, or in addition to, standard CPUs. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computer processors; and
one or more storage devices storing program instructions, wherein the one or more storage devices are coupled to the one or more computer processors, and wherein the program instructions, when executed by the one or more computer processors, cause the one or more computer processors to:
implement one or more programmatic interfaces enabling a client to indicate a signal processing workflow comprising one or more workflow elements to be implemented at least in part using one or more resources of a provider network, wherein for a particular workflow element, the interface enables a client to specify (a) one or more data sources, one or more processing techniques to be applied to data obtained from the one or more data sources, and one or more data destinations to which processed data is to be directed, wherein the one or more processing techniques are selectable via the one or more programmatic interfaces, and (b) one or more operational constraints on the implementation of the particular workflow element, including at least one performance constraint;
receive, via a particular interface of the one or more programmatic interfaces, an indication of a particular signal processing workflow to be implemented, wherein the particular signal processing workflow comprises a particular workflow element;
identify, from among a plurality of resources of the provider network, in accordance with an operational constraint that is specified by the client and associated with the particular workflow element, one or more resources of the provider network to be deployed to implement a particular processing technique indicated for the particular workflow element;
initiate the particular processing technique on a data set obtained from a data source of the particular workflow element; and
transmit results of the particular processing technique on the data set to a data destination of the particular workflow element.

2. The system as recited in claim 1, wherein the particular processing technique comprises one or more of: a demodulation operation, a modulation operation, an image processing operation, a speech processing operation, a fast Fourier transform, an inverse fast Fourier transform, a correlation computation, a matrix manipulation operation, a filtering operation, a beamforming application, a spatial analysis operation, or a compression operation.

3. The system as recited in claim 1, wherein the data source of the particular workflow element comprises one or more of: a cellular device, a mobile phone, an antenna, a sensor, a satellite base station, a digital receiver, a radar device, an audio input device, a camera, an invocation of a programmatic interface, a different workflow element, or a different resource of a network-accessible service implemented at the provider network.

4. The system as recited in claim 1, wherein the data destination of the particular workflow element comprises one or more of: (a) a different resource of the provider network that is allocated to the client, (b) a device external to the provider network, (c) a message queue, (d) an endpoint of a notification service, (e) an email address, (f) a database, (g) a local storage device at the resource at which the particular processing technique is implemented, (h) an in-memory data structure, (i) a web site, (j) a different workflow element, or (k) a task marketplace.

5. The system as recited in claim 1, wherein the operational constraint associated with the particular workflow element comprises one or more of: (a) a budget limit, (b) a response time constraint, (c) a parallelism constraint, (d) a data validation constraint, (e) a data security constraint, (f) a durability constraint for a result of the particular processing technique, or (g) a notification requirement.

6. A method, comprising:
performing, by one or more computing devices:
implementing one or more programmatic interfaces enabling a client to indicate a signal processing workflow comprising one or more workflow elements to be implemented at least in part using one or more resources of a provider network, wherein for a particular workflow element, the interface enables a client to specify one or more data sources, one or more analysis techniques to be applied to data obtained from the one or more data sources, and one or more data destinations to which a result of the one or more analysis techniques is to be directed;
receiving, via a particular interface of the one or more programmatic interfaces, an indication of a particular signal processing workflow to be implemented, wherein the particular processing workflow comprises a particular workflow element;
initiating, at the one or more resources of the provider network and in accordance with an operational constraint specified by the client and associated with the particular workflow element, a particular analysis technique indicated for the particular workflow element on a data set obtained from a data source of the particular workflow element; and
transmitting a result of the particular analysis technique to a data destination of the particular workflow element.

7. The method as recited in claim 6, wherein the particular analysis technique comprises one or more of: a demodulation operation, a modulation operation, an image processing operation, a speech processing operation, a fast Fourier transform, an inverse fast Fourier transform, a filtering operation, a beamforming application, a spatial analysis operation, a correlation computation, a matrix manipulation operation, or a compression operation.

8. The method as recited in claim 6, wherein the data source of the particular workflow element comprises one or more of: a cellular device, a mobile phone, an antenna, a sensor, a satellite base station, a digital receiver, a radar device, an audio input device, a camera, an invocation of a programmatic interface, a different workflow element, or a different resource of a network-accessible service implemented at the provider network.

9. The method as recited in claim 6, wherein the data destination of the particular workflow element comprises one or more of: (a) a different resource of the provider network that is allocated to the client, (b) a device external to the provider network, (c) a message queue, (d) an endpoint of a notification service, (e) an email address, (f) a database, (g) a local storage device at the resource at which the particular processing technique is implemented, (h) an in-memory data structure, (i) a web site, (j) a different workflow element, or (k) a task marketplace.

10. The method as recited in claim 6, wherein said receiving the indication of the particular signal processing workflow comprises receiving the operational constraint associated with the particular workflow element, wherein the operational constraint comprises one or more of: (a) a budget limit, (b) a performance constraint, (c) a parallelism constraint, (d) a data validation constraint, (e) a data security constraint, (f) a durability constraint for a result of the particular analysis technique, or (g) a notification requirement.

11. The method as recited in claim 6, further comprising performing, by the one or more computing devices:
configuring a plurality of resources of the provider network as members of a pool of signal processing resources; and
selecting the one or more resources at which the particular analysis technique is initiated from the pool.

12. The method as recited in claim 6, further comprising performing, by the one or more computing devices:
determining a metric indicating one or more of: (a) an amount of computation performed to implement the particular analysis technique at the one or more resources, (b) an amount of network traffic associated with implementing the particular workflow element, and (c) an amount of storage use associated with implementing the particular workflow element; and
determining a billing amount associated with the particular workflow element based at least in part on the metric.

13. The method as recited in claim 12, further comprising performing, by the one or more computing devices:
enabling a client to indicate, via a programmatic interface, a pricing policy to be used to determine the billing amount, wherein the pricing policy includes an indication of one or more of: (a) a computation unit and a corresponding billing rate, (b) a network traffic unit and a corresponding billing rate, or (c) a storage unit and a corresponding billing rate.

14. The method as recited in claim 6, further comprising performing, by the one or more computing devices:
generating, based at least in part on an optimization objective and at least in part on one or more metrics obtained for the particular workflow element and at least in part on one or more histories of other workflow elements, a recommendation for an alternative workflow to the particular workflow element; and
providing the recommendation to a client on whose behalf the particular workflow element was implemented.

15. The method as recited in claim 6, wherein the particular signal processing workflow comprises a second workflow element, further comprising performing by the one or more computing devices:
receiving an indication that a second analysis technique to be implemented for the second workflow element is to be determined by a signal processing service component based on one or more client-specified criteria;
identifying one or more analysis techniques appropriate for the second workflow element based on the one or more client-specified criteria; and
implementing a selected one of the one or more analysis techniques to implement the second workflow element.

16. A non-transitory computer-accessible storage medium storing program instructions that when executed on one or more processors:
implement one or more programmatic interfaces enabling a client to indicate a signal processing workflow comprising one or more workflow elements to be implemented at least in part using one or more resources of a provider network, wherein for a particular workflow element, the interface enables a client to specify one or more data sources, one or more analysis techniques to be applied to data obtained from the one or more data sources, and one or more data destinations to which a result of the one or more analysis techniques is to be directed;
receive, via a particular interface of the one or more programmatic interfaces, an indication of a particular signal processing workflow to be implemented, wherein the particular processing workflow comprises a particular workflow element;

initiate, at the one or more resources of the provider network and in accordance with an operational constraint specified by the client and associated with the particular workflow element, a particular analysis technique indicated for the particular workflow element on a data set obtained from a data source of the particular workflow element; and transmit a result of the particular analysis technique to a data destination of the particular workflow element.

17. The non-transitory computer-accessible storage medium as recited in claim 16, wherein the particular analysis technique comprises one or more of: a demodulation operation, a modulation operation, an image processing operation, a speech processing operation, a fast Fourier transform, an inverse fast Fourier transform, a filtering operation, a beamforming application, a spatial analysis operation, a correlation computation, a matrix manipulation operation, or a compression operation.

18. The non-transitory computer-accessible storage medium as recited in claim 16, wherein the data source of the particular workflow element comprises one or more of: a cellular device, a mobile phone, an antenna, a sensor, a satellite base station, a digital receiver, a radar device, an audio input device, a camera, an invocation of a programmatic interface, a different workflow element, or a different resource of a network-accessible service implemented at the provider network.

19. The non-transitory computer-accessible storage medium as recited in claim 16, wherein the data destination of the particular workflow element comprises one or more of: (a) a different resource of the provider network that is allocated to the client, (b) a device external to the provider network, (c) a message queue, (d) an endpoint of a notification service, (e) an email address, (f) a database, (g) a local storage device at the resource at which the particular processing technique is implemented, (h) an in-memory data structure, (i) a web site, (j) a different workflow element, or (k) a task marketplace.

20. The non-transitory computer-accessible storage medium as recited in claim 16, wherein the instructions when executed on the one or more processors:

receive an indication of the operational constraint associated with the particular workflow element, wherein the operational constraint comprises one or more of: (a) a budget limit, (b) a performance timing constraint, (c) a parallelism constraint, (d) a data validation constraint, (e) a data security constraint, (f) a durability constraint for a result of the particular analysis technique, or (g) a notification requirement; and implement the particular workflow element in accordance with the operational constraint.

* * * * *